J. McGUIRE.
Sewer-Inlet Trap.
No. 162,403.
Patented April 20, 1875.
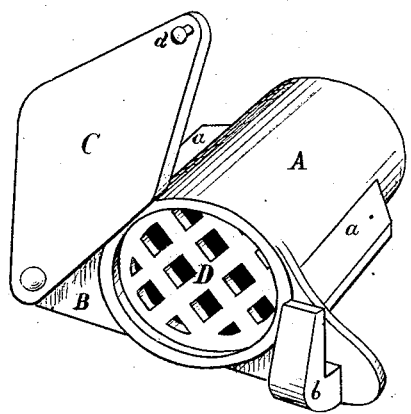
WITNESSES
Roger M. Sherman
William F. Hopson
INVENTOR
John McGuire
by his Attorney
George Terry

UNITED STATES PATENT OFFICE.

JOHN McGUIRE, OF NEW HAVEN, CONNECTICUT.

IMPROVEMENT IN SEWER INLET-TRAPS.

Specification forming part of Letters Patent No. 162,403, dated April 20, 1875; application filed September 25, 1874.

*To all whom it may concern:*

Be it known that I, JOHN McGUIRE, of the city and county of New Haven, in the State of Connecticut, have invented a new and Improved Sewer Inlet-Trap; and I do hereby declare that the following is a full and exact description thereof, reference being had to the accompanying drawing, and to the letters of reference marked thereon, making a part of this specification.

In cities which are built on nearly level ground, the main sewers in the streets are laid with very little descent; and in this city (New Haven, Connecticut) the established grade is a descent of an inch in a hundred feet. The small sewers which connect the privy-vaults in the rear of house-lots with the street-sewers are frequently constructed with even less descent, and, being only from six to ten inches in diameter, fill up and cause great inconvenience and expense.

The object of my invention is to provide a remedy for this inconvenience; and my invention consists in a trap hereinafter more fully set forth and claimed.

The accompanying drawing is a perspective view of the trap.

The trap consists of the cast-iron cylinder A, having the flanges $a$ $a$ on its outside, which are embedded in the wall of the vault, and hold it securely in its place, and of the flange B, to which is pivoted the gate C, which is held firmly against the inner end of the cylinder A by the guide $b$, cast on the flange B. It is also provided with the grating D, placed near the inner end of the cylinder A. The pin $d$ on the gate C is a projection, onto which a rod may be hooked to open and close the gate. The trap is located at the bottom of the vault, and the outward end of the cylinder A is connected with the sewer-pipe in the same way in which pieces of sewer-pipe are put together.

The trap is designed to operate in the following way: Instead of allowing a constant flow of the contents of the vault through the sewer, the gate C is closed and kept so until it is deemed desirable to remove the accumulation, when the vault is filled with water, the gate C opened, and the contents of the vault forced out by the head of water through the small sewer into the main or street sewer. The gate may be again closed and the vault again filled with water, and again run off. This operation may be repeated until the vault is thoroughly washed out, without any risk of filling up the small sewer.

I claim as my invention—

The sewer inlet-trap herein described, consisting of the cylinder A, having the flanges $a$ $a$, and the flange B, on which is cast the guide $b$ of the gate C, pivoted to the flange B, and of the grating D, as and for the purpose set forth.

JOHN McGUIRE.

Witnesses:
GEORGE TERRY,
EARLLEP P. AWINE.